United States Patent
Merk et al.

(10) Patent No.: US 10,968,961 B2
(45) Date of Patent: Apr. 6, 2021

(54) FRICTION CLUTCH

(71) Applicant: Schaeffler Technologies AG & Co. KG, Herzogenaurach (DE)

(72) Inventors: Vladimir Merk, Bühl (DE); Christophe Acker, Gambsheim (FR); Sebastien Morel, Offendorf (FR); Alexander Obitz, Bühl (DE); Marc Helfer, Ottrott (FR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/499,390

(22) PCT Filed: Apr. 5, 2018

(86) PCT No.: PCT/DE2018/100308
§ 371 (c)(1),
(2) Date: Sep. 30, 2019

(87) PCT Pub. No.: WO2018/202238
PCT Pub. Date: Nov. 8, 2018

(65) Prior Publication Data
US 2020/0056665 A1    Feb. 20, 2020

(30) Foreign Application Priority Data
May 4, 2017 (DE) .......................... 102017109516.0

(51) Int. Cl.
*F16D 13/56* (2006.01)
*F16D 13/68* (2006.01)
*F16D 13/71* (2006.01)

(52) U.S. Cl.
CPC ........... *F16D 13/56* (2013.01); *F16D 13/683* (2013.01); *F16D 13/71* (2013.01)

(58) Field of Classification Search
CPC ......... F16D 13/56; F16D 13/683; F16D 13/71
See application file for complete search history.

(56) References Cited

U.S. PATENT DOCUMENTS 1,742,804 A * 1/1930 Carhart .................. F16D 13/56
192/113.23
2,863,537 A * 12/1958 Root ..................... F16D 13/385
192/13 R (Continued)

FOREIGN PATENT DOCUMENTS

DE    4411641 A1    10/1995
EP    2868942 A1    5/2015

*Primary Examiner* — David J Hlavka
(74) *Attorney, Agent, or Firm* — Kevin Parks

(57) ABSTRACT

A friction clutch for coupling a drive shaft of a motor vehicle engine to a transmission input shaft of a motor vehicle transmission includes a lamina, an axially movable contact plate, and a plurality of friction disks. The lamina has a first friction surface facing in a first axial direction, and a second friction surface facing in a second axial direction, opposite the first axial direction. The contact plate has a plurality of holders arranged to hold the lamina. Each of the holders forms a positive connection with the lamina in the circumferential direction, and each of the first friction surface and the second friction surface is frictionally connectible to a friction disk to transmit torque. A first friction disk is arranged to be positioned between a counter plate and the lamina, and a second friction disk is positioned between the lamina and the contact plate.

9 Claims, 2 Drawing Sheets

(56) References Cited

U.S. PATENT DOCUMENTS

| | | | | |
|---|---|---|---|---|
| 4,848,531 | A | * | 7/1989 | Gray ................... F16D 48/064 |
| | | | | 192/13 R |
| 4,977,991 | A | * | 12/1990 | Mahoney ............... F16D 13/56 |
| | | | | 192/70.19 |
| 5,638,932 | A | * | 6/1997 | Mizukami .............. F16D 13/52 |
| | | | | 192/109 R |
| 5,722,524 | A | * | 3/1998 | Mizukami .............. F16D 13/52 |
| | | | | 192/113.22 |
| 5,950,786 | A | * | 9/1999 | Mahoney .............. F16D 13/385 |
| | | | | 192/70.19 |
| 7,318,515 | B2 | * | 1/2008 | Hornbrook ............ F16D 67/02 |
| | | | | 192/13 R |
| 2002/0014386 | A1 | | 2/2002 | Diemer et al. |
| 2003/0234149 | A1 | | 12/2003 | Peterseim et al. |
| 2014/0102846 | A1 | * | 4/2014 | Raber ................... F16D 13/52 |
| | | | | 192/70.11 |
| 2014/0235407 | A1 | * | 8/2014 | Nonaka ................. F16D 13/54 |
| | | | | 477/181 |

\* cited by examiner

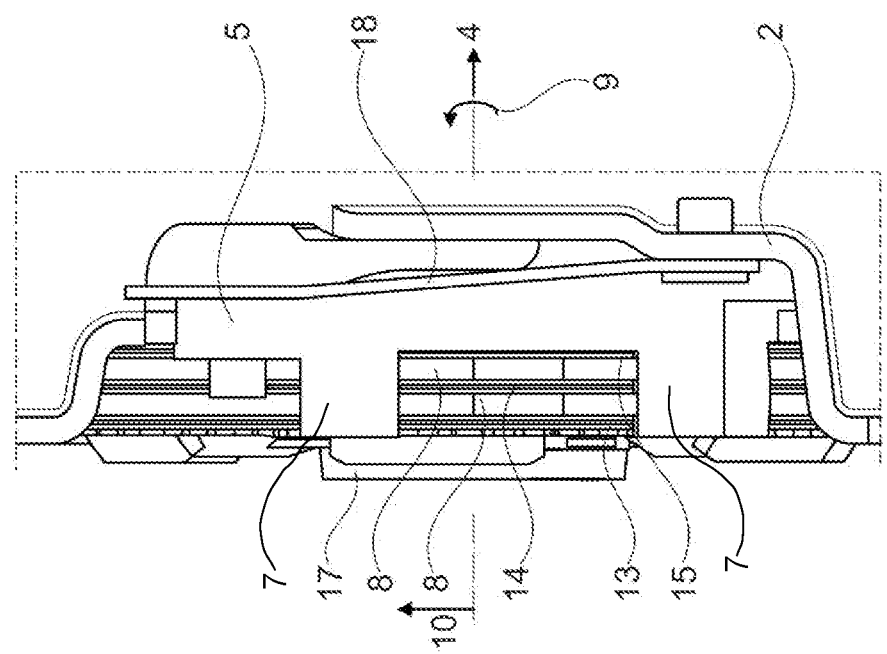
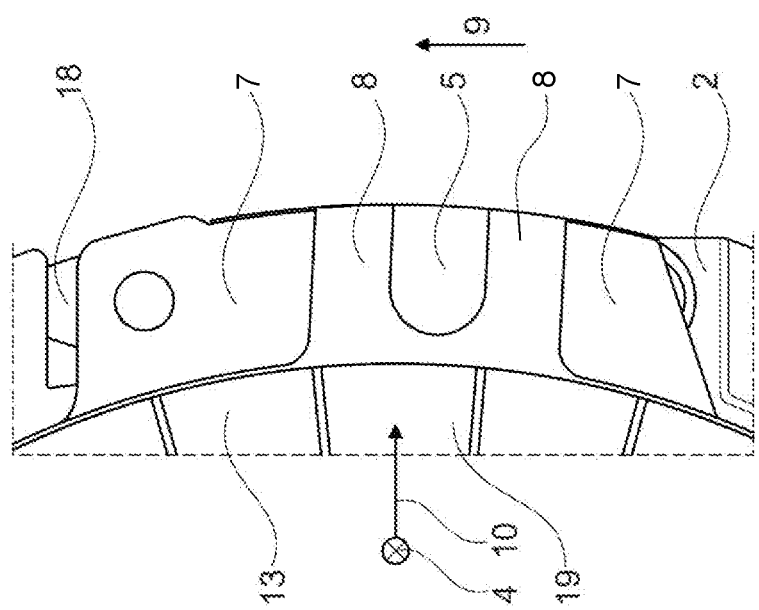

FRICTION CLUTCH

CROSS-REFERENCE TO RELATED APPLICATIONS

This application is the United States National Phase of PCT Appln. No. PCT/DE2018/100308 filed Apr. 5, 2018, which claims priority to German Application No. DE102017109516.0 filed May 4, 2017, the entire disclosures of which are incorporated by reference herein.

TECHNICAL FIELD

The present disclosure relates to a friction clutch for coupling a drive shaft of a motor vehicle engine to a transmission input shaft of a motor vehicle transmission. The friction clutch may be used for a tractor. Other shafts may also be coupled with each other by means of the friction clutch.

BACKGROUND

There is a constant need to produce a friction clutch simply and as economically as possible.

SUMMARY

A friction clutch for coupling a drive shaft of a motor vehicle engine to a transmission input shaft of a motor vehicle is proposed. The friction clutch includes a clutch cover, a contact plate which is movable along an axis of rotation of the friction clutch in an axial direction, and a lever element, for example a diaphragm spring, to actuate the contact plate. The contact plate has a plurality of holders to hold at least one lamina, where each of the holders forms a positive connection with one each of the at least one laminae in a circumferential direction. The at least one lamina has, in a radial direction within the holders, a friction surface on each of the faces facing in the axial direction, each friction surface being frictionally connectible to one of a plurality of friction disks of the friction clutch to transmit torque. A first friction disk can be positioned between a counter plate and the at least one lamina, and a second friction disk between the at least one lamina and the contact plate; both friction disks can be positively connected in the circumferential direction to a hub.

In this friction clutch, the at least one lamina is guided by the contact plate and not by a flywheel of the friction clutch. This makes an adaptation of the flywheel unnecessary. The proposed friction clutch may thus be employed with so-called flat flywheels, instead of only with stepped flywheels. Flat flywheels have in particular a breadth in the axial direction which is set, for example, by the breadth of the toothing or by the breadth of a damping device. In contrast, stepped flywheels have an additional extension in the axial direction to receive the laminae.

The contact plate and the lamina may be tested together, without need of a flywheel which is usually connected to the drive shaft, or of a motor vehicle having a motor vehicle engine and drive shaft.

Furthermore, it is possible, for example, to adopt numerous components from known (even dry), (single) friction clutches, for example clutch cover, diaphragm spring, leaf springs if applicable. This makes it possible to reduce or save costs of development and tools.

The friction clutch may be a normally engaged friction clutch, wherein the contact plate is frictionally connectible to the friction disks by means of the at least one lamina and the counter plate when the lever element is not actuated. When the lever element is actuated, the contact plate is moved away from the counter plate, for example by leaf springs, so that the at least one lamina and the friction disks are no longer frictionally connected. This enables the hub to be uncoupled from the contact plate.

The friction clutch is, for example, a wet clutch. In a wet clutch, a fluid (for example an oil) is transported into the friction clutch, so that the components of the friction clutch (for example the friction surfaces of the laminae and the friction disks, as well as the counter plate and the contact plate) are lubricated and cooled.

The friction clutch may be a single clutch (and not a dual clutch), with one contact plate (and one lever element).

The contact plate may be connected to the clutch cover by means of a plurality of leaf springs. The leaf springs produce a pre-tensioning in the axial direction, so that when the friction clutch is actuated the contact plate is moved away from the counter plate.

Each leaf spring may be joined to the contact plate outside the friction surfaces in the radial direction. The leaf springs may extend in the circumferential direction, and at least partially in the axial direction. In an example embodiment, each leaf spring is also joined to the clutch cover outside the friction surfaces in the radial direction.

In an example embodiment, the friction clutch has at least two laminae; a third friction disk can be positioned between the two laminae, and the third friction disk is frictionally connectible to a hub in the circumferential direction.

A varying number of laminae can be positioned in the plurality of holders of the one contact plate. The positioning of multiple laminae increases the number of friction contacts of the friction clutch, which enables a greater torque to be frictionally transmitted. For example, by increasing the number of friction contacts, it is possible to transmit a very great torque, even when a fluid is present on the friction contacts (wet clutch) and with the resulting coefficient of friction.

Such a contact plate may thus be employed for different application cases. Depending on the greatness of the torque to be transmitted, a requisite number of laminae and friction disks may be employed in the friction clutch, while the same contact plate can be employed for different numbers of laminae and friction disks.

So, for example, one, two, three or even four (or more) laminae may be provided, which are disposed in the holders. Between the laminae as well as between an outer lamina (seen in the axial direction) and the counter plate, as well as between a different outer lamina and the contact plate, in each case one friction disk is positioned. On each face of the friction disks, in each case one friction contact is formed with the respective adjacent component (i.e., counter plate, lamina or contact plate).

The holders (of the plurality of holders) may be arranged at uniform intervals from each other in the circumferential direction. In an example embodiment, a total of three holders are provided, which are spaced 120 degrees apart in the contact plate. In another example embodiment, four holders are provided, which are spaced 90 degrees apart in the contact plate.

The friction clutch may also include the counter plate and the plurality of friction disks (as well as the hub). In an example embodiment, torque produced by the motor vehicle engine is transmitted to the laminae by means of the clutch cover, the contact plate and the counter plate. When there is a frictional connection of counter plate, laminae and contact plate with the friction disks, the torque is transmitted through the friction disks to the hub and through the hub to the transmission input shaft.

Let it be noted, as a precaution, that the ordinal numbers ("first," "second," . . . ) used here serve primarily (only) to differentiate among a plurality of similar objects, values or processes, so that in particular they do not necessarily indicate any dependence and/or sequential order of these objects, values or processes relative to each other. If a dependence and/or sequential order should be necessary, this must be stated here specifically or must be obvious to a person skilled in the art when studying the concretely described design.

BRIEF DESCRIPTION OF THE DRAWINGS

The present disclosure, as well as the technical environment, will be explained in greater detail below on the basis of the figures. It should be pointed out that the disclosure is not to be limited by the exemplary embodiments shown. For example, it is also possible, unless explicitly shown otherwise, to extract partial aspects of the circumstances explained in the figures and to combine them with other components and insights from the present description and/or figures. In particular, it must be pointed out that the figures, and especially the depicted size proportions, are only schematic. Like reference labels designate like objects, so that explanations from other figures may be cited in addition, as appropriate. The figures show the following:

FIG. 2 shows a view of the friction clutch according to FIG. 1 along an axis of rotation; and FIG. 3 shows another side view of the friction clutch according to FIGS. 1 and 2.

FIG. 2 shows a view of the friction clutch 1 according to FIG. 1 along an axis of rotation 3. FIG. 3 shows another side view of the friction clutch 1 according to FIGS. 1 and 2. FIGS. 1 through 3 will be described together below.

Figure 1:
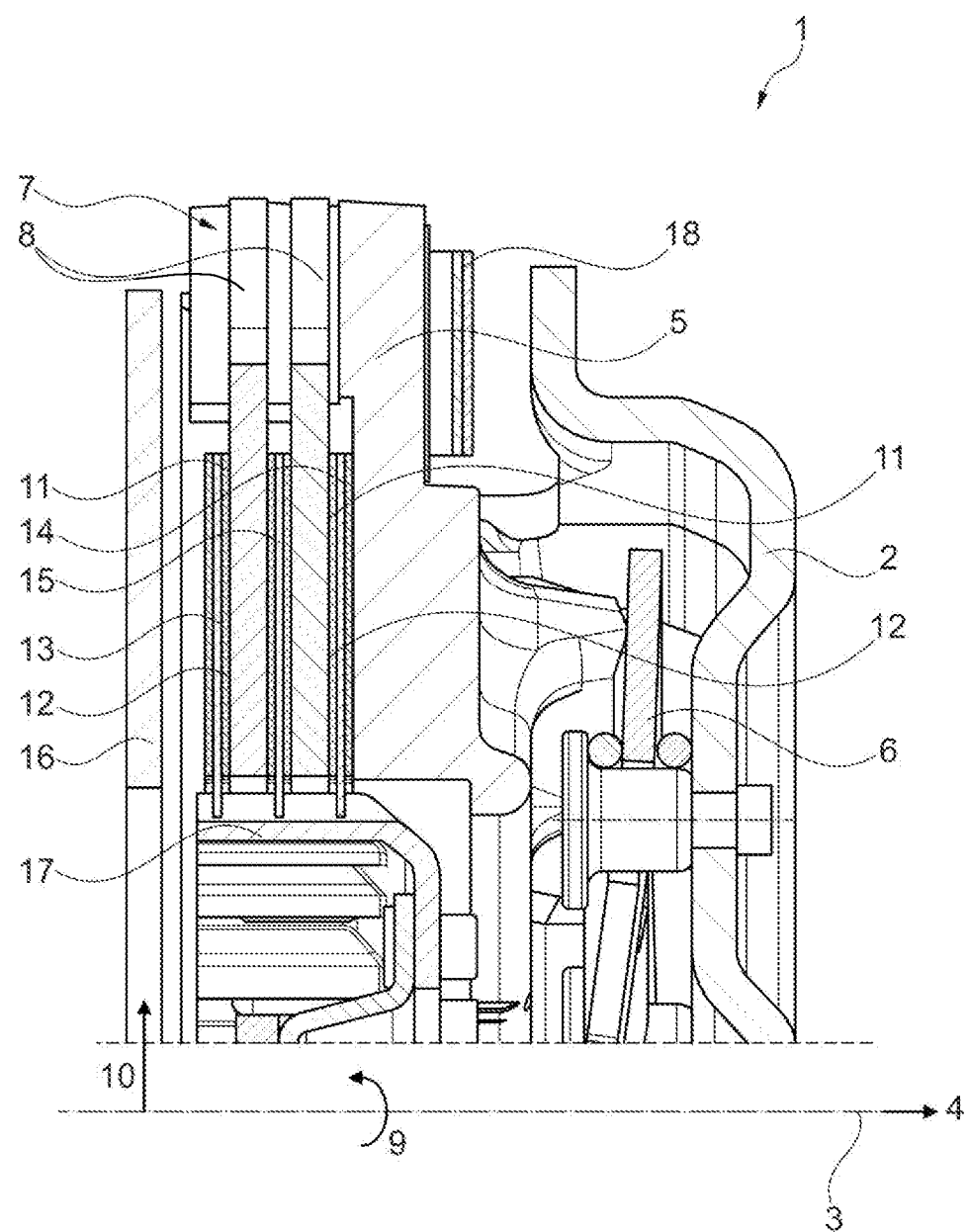
FIG. 1 shows a side view of a friction clutch in cross section.

The friction clutch 1 includes a clutch cover 2, a contact plate 5 which is movable along a rotating shaft 3 of the friction clutch 1 in an axial direction 4, and a lever element 6, here a diaphragm spring, to actuate the contact plate 5. The contact plate 5 has a plurality of holders 7 to hold two laminae 8, where each of the holders 7 forms a positive connection with each of the two laminae 8 in a circumferential direction 9. The two laminae 8 have, in a radial direction 10 within the holders 7, a friction surface 12 on each of the faces 11 facing in the axial direction 4, each friction surface 12 being frictionally connectible to one of a plurality of friction disks 13, 14, 15 of the friction clutch 1 to transmit torque. A first friction disk 13 is positioned between a counter plate 16 and one of the two laminae 8, and a second friction disk 14 between the other of the two laminae 8 and the contact plate 5; all friction disks 13, 14, 15 are connected positively in the circumferential direction 9 to a hub 17.

The friction clutch 1 is a normally engaged friction clutch 1, wherein the contact plate 5 is frictionally connected to the friction disks 13, 14, 15 by means of the lamina 8 and the counter plate 16 when the lever element 6 is not actuated. When the lever element 6 is actuated, the contact plate 5 is moved away from the counter plate 16 by leaf springs 18, so that the laminae 8 and the friction disks 13, 14, 15 are no longer frictionally connected. This enables the hub 17 to be uncoupled from the contact plate 5.

The friction clutch 1 is a single clutch (and not a dual clutch), and has exactly one contact plate 5 and exactly one lever element 6.

The contact plate 5 is connected to the clutch cover 2 by a plurality of leaf springs 18. The leaf springs 18 produce a pre-tensioning in the axial direction 4, so that when the friction clutch 1 is actuated, the contact plate 5 is moved away from the counter plate 16.

Each leaf spring 18 is joined to the contact plate 5 outside the friction surfaces 12 in the radial direction 10. The leaf springs 18 extend in the circumferential direction 9, and at least partially in the axial direction 4. Each leaf spring 18 is joined to the clutch cover 2 outside the friction surfaces 12 in the radial direction 10.

The friction clutch 1 has two laminae 8; a third friction disk 15 is positioned between the two laminae 8, and the third friction disk 15 is frictionally connected to a hub 17 in the circumferential direction 9.

A varying number of laminae 8 can be positioned in the plurality of holders 7 of the one contact plate 5. The positioning of multiple laminae 8 increases the number of friction contacts of the friction clutch 1, which enables a greater torque to be frictionally transmitted. In particular, by increasing the number of friction contacts it is possible to transmit a very great torque, even when a fluid is present on the friction contacts (wet clutch) and with the resulting coefficient of friction.

So, for example, one, two, three or even four (or more) laminae 8 may be provided, which are disposed in the holders 7. Between the laminae 8 as well as between an outer lamina 8 (seen in the axial direction 4) and the counter plate 16, as well as between a different outer lamina 8 and the contact plate 5, in each case one friction disk 13, 14, 15 is positioned. On each face 19 (facing in the axial direction 4) of the friction disks 13, 14, 15, in each case one friction contact is formed with the respective adjacent component (i.e., counter plate 16, lamina 8 or contact plate 5).

Torque produced by the motor vehicle engine is transmitted to the laminae 8 by means of the clutch cover 2, the contact plate 5 and the counter plate 16. When there is a frictional connection of counter plate 16, laminae 8 and contact plate 5 to the friction disks 13, 14, 15, the torque is transmitted through the friction disks 13, 14, 15 to the hub 17 and through the hub 17 to the transmission input shaft.

REFERENCE NUMERALS 1 friction clutch
2 clutch cover
3 axis of rotation
4 axial direction
5 contact plate
6 lever element
7 holder
8 lamina
9 circumferential direction
10 radial direction
11 face
12 friction surface
13 first friction disk
14 second friction disk
15 third friction disk
16 counter plate
17 hub
18 leaf spring
19 face

The invention claimed is:

1. A friction clutch for coupling a drive shaft of a motor vehicle engine to a transmission input shaft of a motor vehicle transmission, comprising:
   an axis of rotation;
   a clutch cover;
   a counter plate fixed to the clutch cover;
   at least one lamina comprising:
      a first friction surface facing in a first axial direction; and
      a second friction surface facing in a second axial direction, opposite the first axial direction;
   an axially movable contact plate comprising a plurality of holders radially outside of the first friction surface and the second friction surface, and arranged to hold the at least one lamina;
   a lever element for actuating the axially movable contact plate; and
   a plurality of friction disks arranged for connection to a hub in a circumferential direction, wherein:
      each one of the plurality of holders forms a positive connection with the at least one lamina in the circumferential direction;
      each of the first friction surface and the second friction surface is frictionally connectible to a one of a plurality of friction disks to transmit torque; and
      a first one of the plurality of friction disks is arranged to be positioned between the counter plate and the at least one lamina, and a second one of the plurality of friction disks is positioned between the at least one lamina and the axially movable contact plate.

2. The friction clutch of claim 1, wherein:
   the friction clutch is a normally engaged friction clutch; and
   the at least one lamina and the counter plate frictionally connect the axially movable contact plate to the plurality of friction disks when the lever element is not actuated.

3. The friction clutch of claim 1, wherein the friction clutch is a wet clutch.

4. The friction clutch of claim 1, wherein the friction clutch is a single clutch comprising exactly one contact plate.

5. The friction clutch of claim 1 further comprising a plurality of leaf springs connecting the axially movable contact plate to the clutch cover.

6. The friction clutch of claim 5, each one of the plurality of leaf springs leaf spring is fixed to the axially movable contact plate radially outside of the first friction surface and the second friction surface.

7. The friction clutch of claim 1 wherein:
   the at least one lamina comprises a first lamina and a second lamina; and,
   a third one of the plurality of friction disks is positioned between the first lamina and the second lamina.

8. The friction clutch of claim 1, wherein the at least one lamina comprises a varying number of laminae positioned in the plurality of holders.

9. The friction clutch of claim 1, wherein the holders are spaced evenly apart from each other in the circumferential direction.

* * * * *